(12) United States Patent
Whitener et al.

(10) Patent No.: US 6,501,201 B1
(45) Date of Patent: Dec. 31, 2002

(54) GENERATOR ROTOR LEAD PATH CONFIGURATION

(75) Inventors: Randy Edward Whitener, Oviedo, FL (US); Henk Roel Jan Van Ravenswaay, Oviedo, FL (US); Thomas Leonard Schuchart, Oviedo, FL (US); William Cannon Gardner, Rockhill, SC (US); Mark Steven Peavy, Orlando, FL (US)

(73) Assignee: Siemens Westinghouse Power Corporation, Orlando, FL (US)

( * ) Notice: Subject to any disclaimer, the term of this patent is extended or adjusted under 35 U.S.C. 154(b) by 0 days.

(21) Appl. No.: 09/678,132

(22) Filed: Oct. 4, 2000

(51) Int. Cl.[7] .......................... H02K 1/32; H02K 11/00
(52) U.S. Cl. ............................................ 310/71; 310/61
(58) Field of Search .......................... 310/71, 61, 58, 310/54, 52, 68 R, 261

(56) References Cited

U.S. PATENT DOCUMENTS

| | | | |
|---|---|---|---|
| 3,916,230 A | * 10/1975 | Albaric et al. | 310/61 |
| 4,074,155 A | 2/1978 | Haditsch et al. | 310/59 |
| 4,091,299 A | 5/1978 | Vichenko et al. | 310/71 |
| 4,155,019 A | 5/1979 | Weghaupt | 310/61 |
| 4,712,029 A | 12/1987 | Nold | 310/71 |
| 4,870,308 A | 9/1989 | Sismour | 310/71 |
| 5,015,895 A | * 5/1991 | Obley | 174/152 R |
| 5,039,896 A | * 8/1991 | Adams et al. | 310/180 |
| 5,104,332 A | * 4/1992 | McCoy | 439/290 |
| 5,122,696 A | 6/1992 | Shih et al. | 310/71 |
| 5,241,231 A | 8/1993 | Haditsch et al. | 310/71 |
| 5,300,847 A | 4/1994 | Haditsch | 310/61 |
| 5,777,408 A | 7/1998 | Brem | 310/71 |
| 5,793,142 A | * 8/1998 | Salter et al. | 310/153 |
| 6,236,128 B1 | * 5/2001 | Dragash, Jr. | 277/347 |

* cited by examiner

Primary Examiner—Nestor Ramirez
Assistant Examiner—Dang Dinh Le (57) ABSTRACT

A generator rotor lead path configuration includes a plurality of electrically conductive components attached to each other. These components may include an axial lead, a flexible connector, an intermediary, a radial lead, and/or a J-strap. The improved lead path inhibits, if not prevents, lead path failure. A method of assembling or fitting the lead path into a generator is also provided, as well as a method of replacing or retrofitting a lead path that is susceptible to failure with the improved lead path configuration. Assistance in determining causes of lead path failure and ways to overcome lead path failure are also provided.

20 Claims, 4 Drawing Sheets

GENERATOR ROTOR LEAD PATH CONFIGURATION

FIELD OF THE INVENTION

The present invention relates in general to a lead path configuration for an electric device and, more particularly, to an improved lead path configuration for a generator rotor used in a power generation plant.

BACKGROUND OF THE INVENTION

Many power generation plants produce electricity by converting energy (e.g. fossil fuel, nuclear fission, hydraulic head and geothermal heat) into mechanical energy (e.g. rotation of a turbine shaft), and then converting the mechanical energy into electrical energy (e.g. by the principles of electromagnetic induction).

Some of these power generation plants, such as a fossil-fuel power generation plant, comprise a turbine, a generator and an exciter. The turbine, generator and exciter are typically coupled to each other in axial alignment, with the generator located between the turbine and the exciter.

The turbine converts fossil fuel energy into mechanical energy in the form of turbine shaft rotation through a steam or combustion cycle. The generator then converts the rotational energy into electrical energy. The generator includes an axially extending rotor journaled in an annular stator that surrounds and sleeves the rotor. The rotor has a shaft in which conductive coil windings are axially arranged. The stator has punchings that collectively from an annular core in which conductive coil windings are positioned parallel with respect to the axial rotor coils. As the turbine shaft rotates the generator rotor, the exciter provides an electrical current to the rotor coil windings. The rotating electrically charged rotor creates a magnetic flux that induces an electrical current in the stationary stator coil windings. This induced electrical current is then drawn from the stator and constitutes the electricity that the power generation plant provides to electricity consumers.

One aspect of the above-described power generation scheme involves the electrical interconnection of the exciter and generator. An electrically conductive lead path is used to transport current in a closed loop configuration from the exciter, through the generator rotor coil windings, and then back to the exciter. It has been observed that, as a result of prolonged generator use, the lead path can physically sever or otherwise fail to properly carry current. Among other things, lead path failure can cause electric arcing or re-routing of the electric current through nearby conductive materials. Arcing and re-routing can, among other things, melt portions of the generator shaft and otherwise damage the generator.

It has also been observed that some portions of the lead path tend to fail more often than other portions of the lead path. In particular, it has been observed that lead path failure tends to occur along a portion of the lead path around area A shown in FIG. 2.

There is thus a need for a lead path that inhibits, if not prevents, lead path failure. There is also a need for a portion of a lead path that is particularly suited to inhibit, if not prevent, lead path failure path around area A shown in FIG. 2. There is further need for a lead path that improves upon the prior art.

SUMMARY OF THE INVENTION

Figure 2:
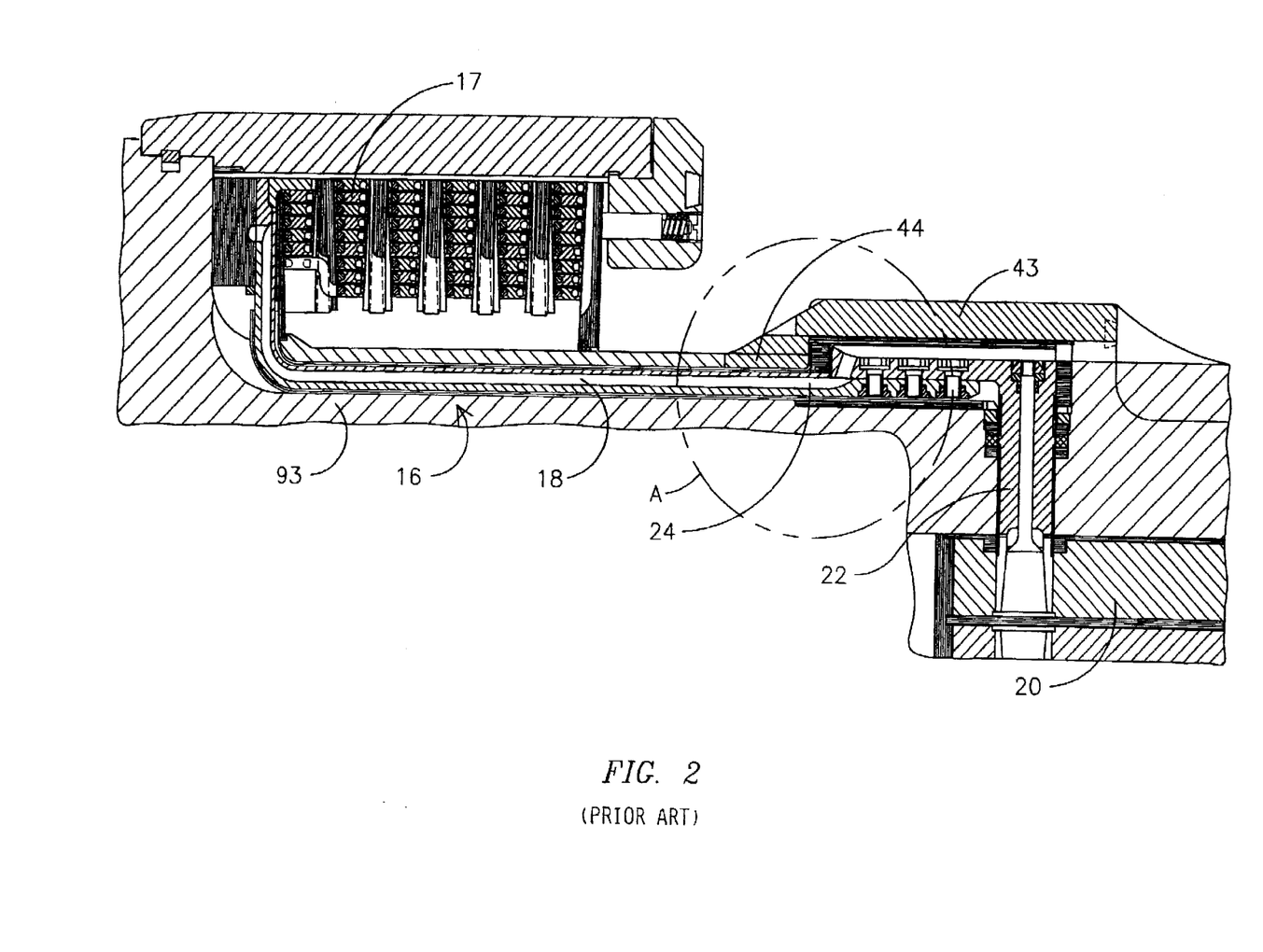
FIG. 2 is a cutaway side elevation view of a lead path that transports current from the exciter, through the generator rotor coil windings, and then back to the exciter.

The present invention provides a lead path that inhibits, if not prevents, lead path failure, especially around area A shown in FIG. 2. The present invention also provides a method of assembling or fitting the lead path of the present invention into a generator. The present invention further provides a method of repairing or retrofitting a lead path that has failed or is susceptible to failure with the lead path of the present invention. The present invention also recognizes that causes of lead path failure around area A shown in FIG. 2 are relatively unknown. Thus, the present invention also provides assistance in determining causes of lead path failure and identifies ways to overcome lead path failure.

One aspect of the present invention thus involves an apparatus adapted to form a conductive path for carrying an electric current in a generator. The apparatus comprises an electrically conductive axial lead having a first end and a second end, and forming a portion of the conductive path. The apparatus further comprises an electrically conductive strap having a first end and a second end, and forming a portion of the conductive path. The apparatus further comprises an electrically conductive radial lead having a first end and a second end, the radial lead forming a portion of the conductive path and coupled to the axial lead and to the strap, the radial lead not being supported by a blower hub wedge portion of the generator.

Another aspect of the present invention thus involves a method of retrofitting an electrical lead path of a generator. The method comprises removing at least a portion of an electrically conductive radial lead from the generator, the radial lead including a radially extending arm. The method further comprises removing at least a portion of an electrically conductive strap from the generator, the strap including a first end and a second end and adapted to attach to the radial lead. The method further comprises inserting at least one electrically conductive component into the generator to form at least a portion of the lead path, the at least one electrically conductive component including a modified radial lead having a radially extending portion. The method further comprises coupling the modified radial lead to the conductive strap. Whereby, the location of the radially extending portion of the modified radial lead within the lead path is inboard of the location of the radially extending arm of the removed radial lead within the lead path.

Yet another aspect of the present invention thus involves a method of choosing a plurality of electrically conductive components to inhibit electrical failure in a lead path of a generator. The method comprises identifying at least one phenomenon that may cause lead path failure. The method further comprises providing a plurality of electrically conductive components adapted to inhibit the identified at least one phenomenon from causing lead path failure, the plurality of electrically conductive components including a component constructed of a high strength conductive material capable of withstanding the stress and load forces produced by the generator during normal generator operation. The method further comprises arranging and attaching the plurality of electrically conductive components to form the lead path.

Further aspects, features and advantages of the present invention will become apparent from the drawings and detailed description of the preferred embodiment that follows.

BRIEF DESCRIPTION OF THE DRAWINGS

The above-mentioned and other concepts of the present invention will now be addressed with reference to the drawings of the preferred embodiment of the present invention. The illustrated embodiment is intended to illustrate, but not to limit the invention. The drawings contain the following figures, in which like numbers refer to like parts throughout the description and drawings and wherein.

DETAILED DESCRIPTION OF THE PREFERRED EMBODIMENT

The generator rotor lead path configuration described herein employs several basic concepts. For example, one concept relates to a lead path that inhibits, if not prevents, failure during the lifetime of a generator that experiences normal use and routine maintenance. Another concept relates to a method of configuring and assembling a plurality of conductive components to form a lead path. Yet another concept relates to a method of retrofitting an existing generator to provide the generator the lead path of the present invention.

The present embodiment of the invention is disclosed in context of use with a generator, for example, one having a similar design as a 2-pole hydrogen cooled, direct cooled rotor, with watercooled stator windings (Turbogenerator, hydrogen-cooled, axially direct-cooled rotor winding, direct water(fluid)-cooled, or "THDF") generator that has been sold by the Siemens Corporation. The principles of the present invention, however, are not limited to THDF type generators. Instead, it will be understood by one skilled in the art, in light of the present disclosure, that the present invention disclosed herein can be successfully utilized in connection with other types of generators. One skilled in the art may also find additional applications for the lead path, components thereof, and methods disclosed herein, such as with other dynamoelectric machines, motors, wirings and apparatuses that use a conductive path. Thus, the illustration and description of the lead path of the present invention in connection with an exemplary generator is merely one possible application of the lead path of the present invention.

To assist in the description of the invention described herein, the following terms are used. "Inboard" and "outboard" are used to describe relative location, with "inboard" describing a location that is closer to the physical center of the generator rotor length than a location that is "outboard." Thus, a component that has an "inboard end" and an "outboard end" can be understood to be arranged such that one end is closer to the physical center of the generator rotor length than the other end.

Figure 1:
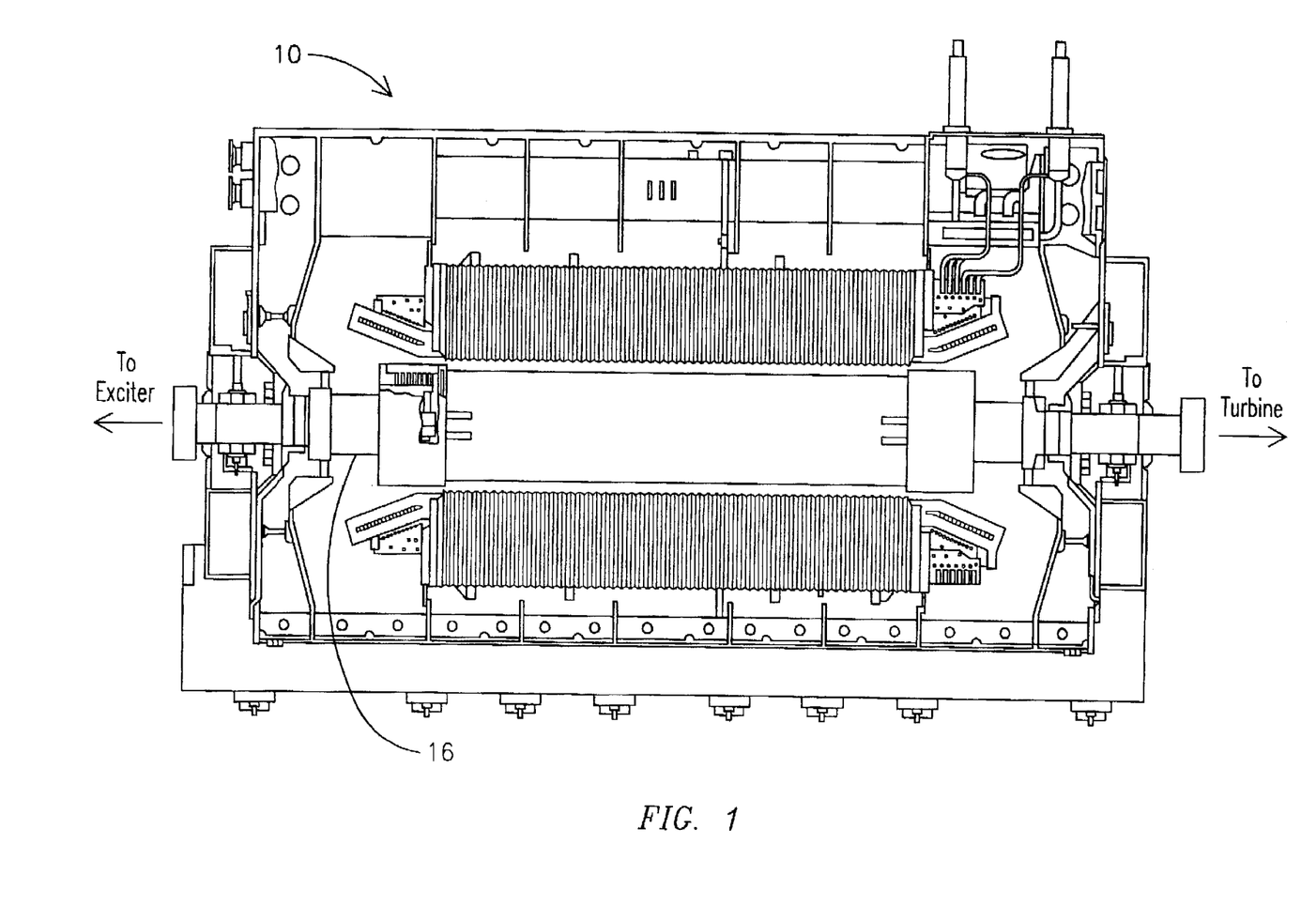
FIG. 1 is a cutaway side elevation view of a generator in accordance with the present invention.

An overview of an exemplary existing generator and generator lead path is provided, followed by a more detailed explanation of the lead path of the present invention, to include various component parts and methods of use. Referring to FIGS. 1 and 2, a generator 10 is coupled in axial alignment between a turbine 12 and an exciter 14. The exciter 14 provides an electrical current to the generator rotor 16. The current typically is a direct current. The current travels from the exciter 14 in a closed loop configuration along a conductive lead path 18 that travels through the generator rotor coil windings 17 and then back through another conductive lead path to the exciter 14.

The lead path 18 commonly comprises a plurality of discrete interconnected conductive components, rather than a single unitary component. There are a variety of reasons why a plurality of components are advantageously used. For example, generator components near the lead path 18 often cause a portion of the lead path 18 to take on a particular size or shape. For another example, generator components near the lead path 18 often cause the lead path 18 to be attached to the generator in a particular manner. For yet another example, the lead path 18 often experiences varying stress and load forces. For an additional example, generator fabrication and maintenance efforts can be hindered if the lead path 18 comprises a single long unitary component.

Figure 3:
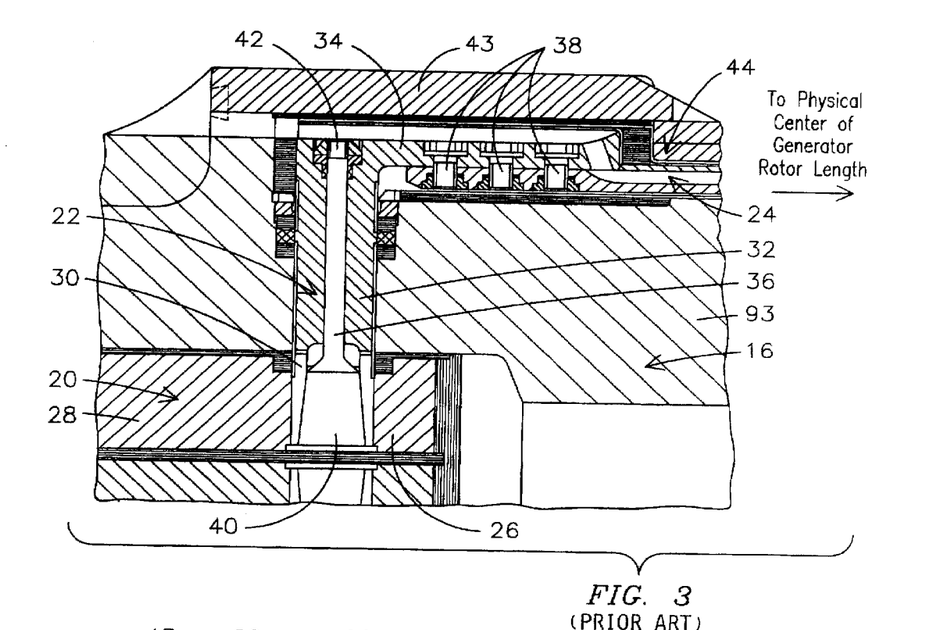
FIG. 3 is a detail view of FIG. 2, showing a portion of the lead path.

FIGS. 2 and 3 show an exemplary existing lead path 18 comprising an axial lead 20, a radial lead 22, and a J-strap 24. The axial lead 20 physically and electrically connects with the exciter 14 and has an inboard end 26 and an outboard end 28, with a hole 30 therebetween. The radial lead 22 has a generally L-shaped configuration with a cylindrical first arm 32 and a rectangular second arm 34, and a central hole 36 that extends through the length of the first arm 32 and three smaller holes 38 that extend perpendicular to the length of the second arm 34. The radial lead 22 is connected to the axial lead 20 by aligning the first arm 32 of the radial lead 22 into the hole 30 in the axial lead 20. Once aligned, the circumference of the first arm 32 is expanded to achieve a tight fit between the radial lead 22 and the axial lead 20. The circumferencial expansion can be performed in a variety of ways, such as by placing a threaded mandrel (not shown) into one end 40 of the central hole 36 and then pulling the mandrel through at least a portion of the end 40 of the central hole 36 via a nut positioned at the opposite end 42. The radial lead 22 is supported and restrained in the rotor 16 by the blower hub wedge 43. The J-strap 24 is connected to the radial lead 22 by positioning the J-strap 24 radially under the second arm 34 and bolting the J-strap 24 to the radial lead 22 via the three smaller holes 38. Further inboard, the J-strap 24 is restrained and supported in the rotor 16 by several shaft wedges 44.

With the lead path 18 in this exemplary configuration, it has been observed that the lead path 18 tends to sever or otherwise fail near area A. It has been found that a variety of phenomena may cause or tend to cause to the lead path to sever or otherwise fail near area A. One phenomenon involves variations in lead path support, since the radial lead is restrained and supported by the blower hub wedge, and a portion of the J-strap is retrained and supported by the blower hub wedge while another portion of the J-strap is restrained and supported by the shaft wedges 44. This restraint and support configuration may cause various and varying stresses, stress concentrations, and loads on the lead path during generator startup and operation. Another phenomenon involves J-strap slot binding, which may inhibit thermal expansion, and/or cause higher mean stresses. Another phenomenon involves variations in J-strap load support, which may be caused by variations in insulation thickness, radial migration of the radial lead, and/or blower hub shrink fit. Another phenomenon involves J-strap stress concentrations, which may be caused by the ventilation hole of the ventilation path, cross-section variations, the brazed-on ventilation cover, cut insulation, and/or the radial lead connection. Another phenomenon involves a nonparallel abutting surface between the radial lead and J-strap, which can result in J-strap bending and/or higher mean stresses, and may be caused by loading of the radial lead. Moreover, the combination of one or more of the above-identified phenomenon may exasperate lead path problems during generator startup and operation.

Components of the Present Invention

FIGS. 4A–4E show various components of the lead path 18 of the present invention and are described below. These components include a modified radial lead component 50, an intermediary component 60, a flexible connector component 68, a modified J-strap component 78, and a modified axial lead component 86. The components are intended to address and withstand the varying and various stresses, stress concentrations, forces and loads that are exerted along the lead path 18, especially around area A shown in FIG. 2, during normal generator operation in order to inhibit, if not, prevent lead path failure.

Figures 4A, 4B, 4C, 4D, 4E:
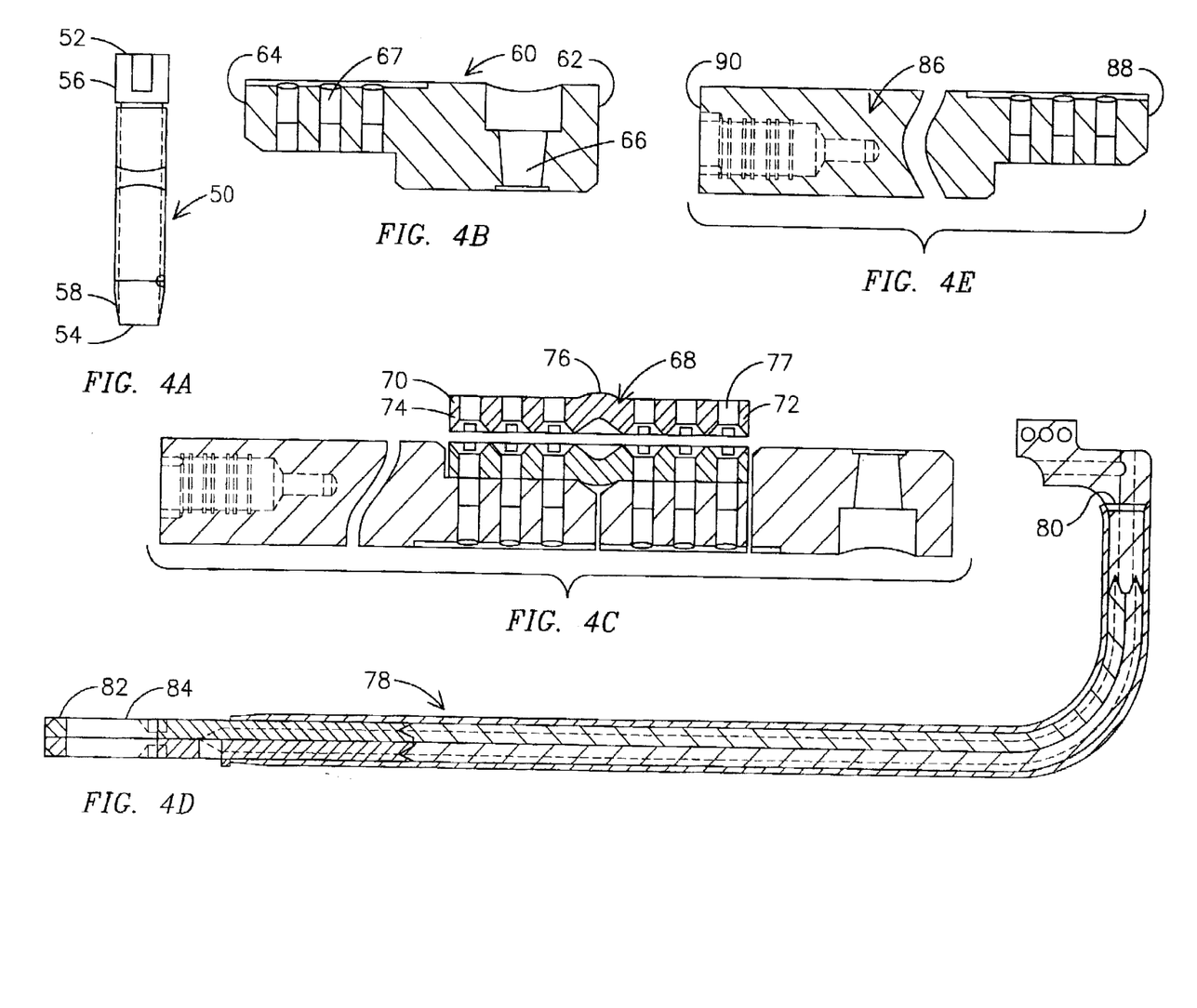
FIG. 4A is a side elevation view of a radial lead component of the present invention.
FIG. 4B is a side elevation view of an intermediary component of the present invention.
FIG. 4C is a side elevation view of a flexible connector component of the present invention.
FIG. 4D is a side elevation view of a J-strap component of the present invention.
FIG. 4E is a side elevation view of an axial lead component of the present invention.

FIG. 4A shows a modified radial lead component 50 of the present invention. The radial lead 50 is advantageously constructed of a high-strength conductive material, preferably an alloy, to withstand the varying and various stresses, loads and other forces exerted on it during generator operation. The radial lead 50 has a preferable strength of at least about 10 ksi, more preferably about 20 ksi to about 100 ksi, and most preferably about 40 ksi to about 70 ksi. The high-strength conductive material may be constructed of an essentially unlimited variety of materials and combinations of materials. For example, the material may be constructed of a single chemical element such as aluminum, however, an alloy, composite or laminate is preferred due to strength and cost considerations. Suitable alloys preferably include one or more electrically conductive chemical elements, such as copper or aluminum combined with one or more high-strength chemical elements (i.e. suitable to provide the alloy with the at least about 10 ksi in strength), such as beryllium, cadmium, nickel, zirconium, chromium, and aluminum. The particularly identified exemplary alloys are preferred due to strength and cost considerations, although any other suitable chemical element or alloy could be used. One suitable preferred alloy is an alloy comprising at least about 20% copper and at least about 0.01% zirconium.

The radial lead 50 has a generally cylindrical configuration with a first or upper end 52 and a second or lower end 54, although other geometries could be used. The upper end 52 is advantageously threaded 56 for easy connection to the J-strap 78, as described below, while the lower end 54 is advantageously threaded and tapered 58 for easy connection to the intermediary 60, as described below. The radial lead 50 has a preferable length of at least 5 inches and more preferably about 12 inches, and a preferable diameter of at least about 1 inch and more preferably about 2.5 inches.

FIG. 4B shows an intermediary component 60 of the present invention. The intermediary 60 is advantageously constructed of the same or a similar material as the radial lead 50. The intermediary 60 has a generally semicircular configuration with a first or inboard end 62 and a second or outboard end 64, although other geometries could be used. A tapered threaded hole 66 is positioned toward the inboard end 62, and is sized and configured to accept the tapered threaded 58 lower end 54 of the radial lead 50. The intermediary 60 has a preferable length of at least about 5 inches and more preferably about 15 inches, and a preferable diameter of at least about 2 inches and more preferably about 8 inches. The intermediary 60 may include one or more bolt-holes 67, for example 6 bolt-holes, to assist in bolting it to other components of the lead path 18. However, other suitable means could be used to fasten the intermediary 60 to other components, such as clamps, clips, adhesives, magnets, soldering, friction locks, brazing, other threaded or nonthreaded fasteners and the like.

FIG. 4C shows a flexible connector component 68 of the present invention. The illustrated flexible connector 68 is constructed of a conductive material, such as copper, but could also be made of the above-described high strength conductive material. However, since it has been found that the stresses and forces exerted on the flexible connector 68 tend to be not as strong as those exerted on the radial lead 50 or the intermediary 60, and/or due to the below-described configuration of the flexible connector 68, a high strength conductive material is not advantageous to accomplish the purpose of the invention and costs more than copper.

The flexible connector 68 is constructed of at least one elongated sheet 70, each sheet 70 having a preferable thickness of no more than about 0.3 inch, and more preferably about 0.02 inch to about 0.07 inch. The flexible connector 68 preferably comprises at least 5 sheets stacked upon each other, and most preferably about 10 to about 50 sheets stacked upon each other. Each sheet 70 has a first or inboard end 72, a second or outboard end 74, and a raised middle cantinary 76. The inboard and outboard ends 72, 74 have a length of about 3 inches to about 6 inches, while the middle cantinary 76 has a length of about 2 inches to about 4 inches and a height of about 0.1 inch to about 1 inch. The portions of the sheets 70 that form the ends 72, 74 are advantageously connected to each other and more advantageously brazed, while the portions of the sheets 70 that form the middle cantinary 76 advantageously remain unattached from each other and non-brazed. By this configuration, the flexible connector 68 can bend, contort and otherwise accept the stresses and forces that may otherwise cause the lead path to sever or otherwise fail. This configuration also allows certain portions of the flexible connector 68 (e.g. the middle 76) to be relatively more flexible that other portions of the flexible connector (e.g. the ends 72, 74). The flexible connector 68 may include one or more bolt-holes 77, for example 6 bolt-holes, to assist in bolting it to other components of the lead path 18.

FIG. 4D shows a strap or J-strap component 78 of the present invention. The J-strap 78 is advantageously constructed of the same or a similar material as the flexible connector 68. The J-strap 78 preferably has a generally elongated shape with a curvature toward one end, or a J-shaped configuration, with a first or inboard end 80 and a second or outboard end 82, although other geometries could be used. The inboard end 80 is sized and configured to connect to the rotor windings 17, and the outboard end 82 has an eyelet 84 that is sized and configured to accept the upper end 52 of the radial lead 50. The J-strap 78 has a preferable length of at least about 2 inches to about 80 inches and more preferably about 36 inches. The term "strap" or "J-strap" is not intended to limit those terms to a thin, flexible, pliant or looped element, rather, the term "strap" or "J-strap" is used only to describe the elongated nature of the element, as will be understood by those skilled in the art.

FIG. 4E shows an axial lead component 86 of the present invention. The axial lead 86 is advantageously constructed of the same or a similar material as the J-strap 78. The axial lead 86 has a generally semicircular configuration, although other geometries could be used, with a first or inboard end 88 sized and configured to connect to the flexible connector 68, and a second or outboard end 90 sized and configured to connect to the exciter 14. The axial lead 20 has a preferable length of about 20 inches to about 150 inches, and more preferably about 60 inches, and a preferable diameter of about 2 inches to about 10 inches and more preferably about 8 inches. The axial lead 86, or portion thereof, may comprise the same material and have generally similar dimensions to the axial lead 20, or portion thereof, described in connection with the exemplary existing generator 10. Thus, the axial lead 86 may be a modification of the existing axial lead 20.

The above-described components have been provided in terms of certain preferred and/or advantageous materials, dimensions, configurations, and connections to other components (i.e. "specifications"). These specifications are provided with respect to the above-identified exemplary generator type. It will be understood by one skilled in the art that such disclosed specifications can be modified for use with other generators or apparatuses both presently known and later developed. It will also be understood by one skilled in the art that various specifications of one or more components can be interchanged and used with various specifications of one or more other components, consistent with the purposes of the present invention. It will be further understood by one skilled in the art that not all of the above-described components are required to provide the lead path of the present invention. For example, one or more components may be disregarded and other components modified or adapted to replace the disregarded component(s).

Assembly of the Present Invention

FIGS. 4A–4E and 5 show an exemplary assembly of the lead path 18 of the present invention. For ease of explanation and understanding only, and in no way to limit the scope of the invention, the exemplary lead path 18 assembly is provided without every consideration that may be found if the lead path 18 is assembled within a previously assembled generator.

Figure 5:
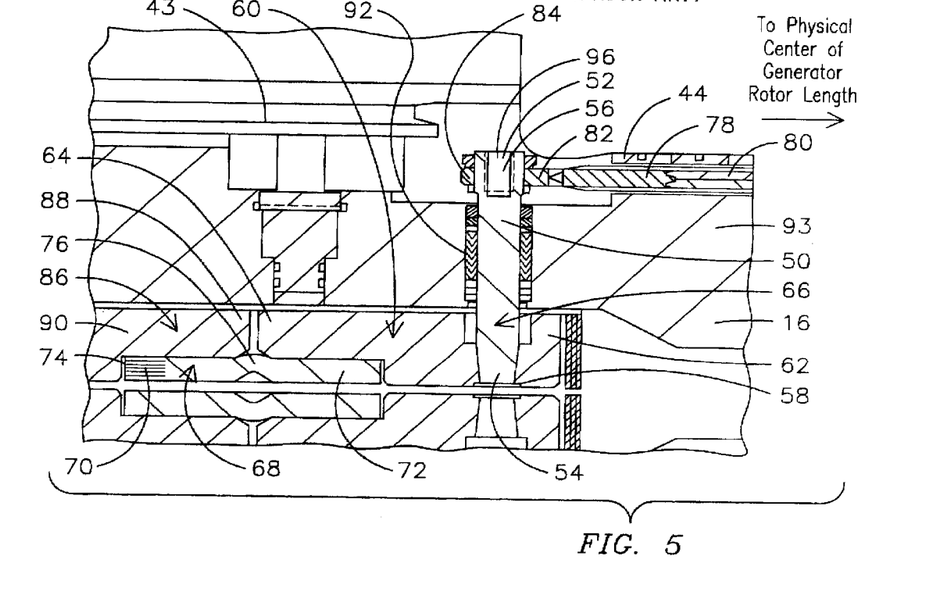
FIG. 5 is a detail view similar to the detail view of FIG. 3, showing a portion of the lead path that uses lead path components of the present invention shown in FIGS. 4A–4E.

The outboard end 90 of the axial lead 86 is preferably attached to the exciter 14 via the rotor shaft coupler. The inboard end 88 of the axial lead 86 is preferably attached near the outboard end 74 of the flexible connector 68 by any suitable connection method, such as bolting, welding and the like. The inboard end 72 of the flexible connector 68 is preferably attached near the outboard end 64 of the intermediary 60 by any suitable connection method, such as bolting, welding and the like. The inboard end 62 of the intermediary 60 is preferably attached near the lower end 54 of the radial lead 50 by screwing the tapered threaded end 54 of the radial lead 50 into the tapered threaded hole 66 in the intermediary 60. The upper end 52 of the radial lead 50 is also preferably attached near the outboard end 82 of the J-strap 78 by placing the eyelet 84 of the J-strap 78 through the upper end 52 of the radial lead 50 and advancing one or more threaded washers (not shown) on the threaded end 56 of the radial lead 50 to abut one or both sides of the eyelet 84. The radial lead 50 is advantageously arranged between the axial lead 20 and J-strap 24, one way of providing such an arrangement is to place or machine and hole 92 in the rotor shaft 93 and locate at least a portion of the radial lead 50 therein. The inboard end 80 of the J-strap 78 is preferably attached to the rotor coil windings 17 by any suitable connection method, such as bolting, welding and the like.

One result of the above-described exemplary assembly of components is the advantageous ability to provide a self-supporting or freestanding radial lead 50 portion of the lead path 18 that is not in direct contact with the blower hub wedge 43. Direct contact of the radial lead 22 with the blower hub wedge 43 places or transfers varying and various stresses, stress concentrations, forces and loads onto the lead path 18, and particularly onto the radial lead 50 and/or J-strap 78 portions of the lead path 18. It is believed that such a transfer causes or tends to cause lead path 18 failure. Thus, by providing a freestanding radial lead 50 that does not directly contact the blower hub wedge 43, a lesser amount of varying and various stresses, stress concentrations, forces and loads are transferred to the lead path 18.

Another result of the above-described exemplary assembly of components is the advantageous ability to provide a lead path 18 that is in direct contact with the shaft wedges 44 but not in direct contact with the blower hub wedge 43. Direct contact of the lead path 18 with both the blower hub wedge 43 and with the shaft wedges 44 places or transfers varying and various stresses, stress concentrations, forces and loads onto the lead path 18, and particularly onto the radial lead 50 and/or J-strap 78 portions of the lead path 18. It is believed that such a transfer causes or tends to cause lead path 18 failure. Thus, by providing a lead path that is not in direct contact with both the blower hub wedge 43 and shaft wedges 44, a lesser amount of varying and various stresses, stress concentrations, forces and loads are transferred to the lead path 18.

Yet another result of the above-described exemplary assembly of components is the advantageous ability to provide a lead path 18 having the radial lead 50 that is positioned further inboard (i.e. generally toward the axial centerline or the inboard end of the blower hub wedge 43 or generally further inboard than the inboard end of the blower hub wedge 43) relative to the former position of the radial lead 22 (i.e. generally toward the outboard end of the blower hub wedge 43). Positioning the radial lead 50 in its former position places or transfers varying and various stresses, stress concentrations, forces and loads onto the lead path 18, and particularly onto the radial lead 22 and/or J-strap 24 portions of the lead path 18. It is believed that such a transfer causes or tends to cause lead path 18 failure. Thus, by repositioning the radial lead 50 further inboard relative to its former position, a lesser amount of varying and various stresses, stress concentrations, forces and loads are transferred to the lead path 18.

One way to achieve all three of these results with a single lead path 18 configuration is to directly attach the radial lead 50 to the J-strap 78 and to the intermediary 60, as well as to construct the radial lead 50 from a high-strength material to accept additional loads and/or stresses.

It will be understood by one skilled in the art that the present invention does not require that the above-described attachments be performed in any particular order, to include the above-described exemplary order. It will be also understood by one skilled in the art that the above-identified exemplary attachment techniques, as well as other attachment techniques known in the art, can be used to attach any one or more component to any other one or more component, and that any one or more component can be modified to use any one or more of these attachment techniques. For example, the above-identified stresses and forces, as well as spatial requirements, may require certain components to be attached by the above-described eyelet 84 or tapered threaded end 54, while other components that are not so constrained may use those or other attachment techniques. It will be further understood by one skilled in the art that generator assembly or maintenance requirements may result in some or all of the above-described assembly steps to be interchanged, modified or even skipped.

It will be still further understood by one skilled in the art that the disclosed components may be arranged in a variety of ways to provide a radial lead 50 that is not in direct contact with the blower hub wedge 43, and/or that the disclosed components may be arranged in a variety of ways to provide for no portion of the lead path 18 to be in direct contact with both the blower hub wedge 43 and the rotor wedges 44, and/or that the disclosed components may be arranged in a variety of ways to reposition the radial lead 50 further inboard relative to its former position.

Lead Path Retrofit

The above-described lead path components and assembly methods can also be used to retrofit an existing lead path 18 of a generator 10. One way to perform such a retrofit is to physically cut the existing radial lead 22, such as between the central hole 36 and the 3 smaller holes 38 for easy access, to remove all or a portion of the existing radial lead 22, all or a portion of the existing axial lead 20, and/or all or a portion of the J-strap 24, and to machine the hole 92 into the rotor shaft 93. After these existing components or portions thereof are removed, components of the present invention can be used to provide the generator lead path 18 of the present invention.

The outboard end 90 of the axial lead 86 of the present invention is attached to the exciter 14 and the inboard end 80 of the J-strap 78 of the present invention is attached to the rotor coil windings 17, as described above. Other components of the lead path 18 of the present invention are attached as described above. Results of the above-described exemplary retrofit have been described above.

Although this invention has been described in terms of a certain exemplary uses, preferred embodiment, and possible modifications thereto, other uses, embodiments and possible modifications apparent to those of ordinary skill in the art are also within the spirit and scope of this invention. It is also understood that various aspects of one or more features of this invention can be used or interchanged with various aspects of one or more other features of this invention. Accordingly, the scope of the invention is intended to be defined only by the claims that follow.

What is claimed is:

1. An apparatus adapted to form a conductive path for carrying an electric current in a generator, the apparatus comprising:

an electrically conductive axial lead having a first end and a second end, and forming a portion of the conductive path;

an electrically conductive strap having a first end and a second end, and forming a portion of the conductive path;

an electrically conductive radial lead having a first end and a second end, the radial lead forming a portion of the conductive path and coupled to the axial lead and to the strap, the radial lead not being supported by a blower hub wedge portion of the generator, and an electrically conductive intermediary having a generally semicircular configuration and a first end and a second end with a tapered threaded hole positioned therebetween, one end of the intermediary adapted to attach to a flexible connector and the other end of the intermediary adapted to attach to the radial lead, wherein the intermediary is attached to the flexible connector by at least one bolt that extends through at least a portion of the intermediary and at least a portion of the flexible connector.

2. The apparatus of claim 1, wherein the generator has a rotor that extends along the axial length of the generator.

3. The apparatus of claim 2, wherein the current travels in a closed loop from an exciter through the rotor and then back to the exciter.

4. The apparatus of claim 1, wherein the axial lead has a generally semicircular configuration with first and second ends that collectively comprise an inboard end and an outboard end, the axial lead adapted to attach to an exciter.

5. The apparatus of claim 1, wherein the strap is generally J-shaped with first and second ends, the first end having an eyelet and the second end adapted to attach to a coil winding portion of the generator.

6. The apparatus of claim 5, wherein the eyelet is sized and configured to attach to a threaded end of the radial lead.

7. The apparatus of claim 1, wherein the radial lead has a generally cylindrical configuration with first and second ends that collectively comprise an upper end and a lower end, the lower end having a tapered threading and the upper end having a threading, one end of the radial lead adapted to attach to the strap.

8. The apparatus of claim 1, further comprising an electrically conductive flexible connector having a plurality of conductive sheets, at least a portion of at least one sheet being attached to at least a portion of another sheet, the flexible connector forming a portion of the conductive path and adapted to bend in response to normal stress and load forces produced by the generator.

9. The apparatus of claim 8, wherein the flexible connector has an inboard end, an outboard end and a middle, the flexible connector including at least five sheets stacked upon each other and brazed near the inboard and outboard ends but not brazed near the middle, the flexible connector adapted to attach to the axial lead.

10. The apparatus of claim 1, wherein the intermediary is constructed of a high strength conductive material having a strength of at least 10 ksi.

11. The apparatus of claim 1, wherein the radial lead is constructed of a high strength conductive alloy comprising at least about 20% copper and at least about 0.01% zirconium.

12. An apparatus adapted to form a conductive path for carrying an electric current in a generator, the apparatus comprising:

an electrically conductive axial lead having a first end and a second end, and forming a portion of the conductive path;

an electrically conductive strap having a first end and a second end, and forming a portion of the conductive path;

an electrically conductive radial lead having a first end and a second end, the radial lead forming a portion of the conductive path and coupled to the axial lead and to the strap, the radial lead not being supported by a blower hub wedge portion of the generator, and an electrically conductive intermediary having a generally semicircular configuration and a first end and a second end with a tapered threaded hole positioned therebetween, one end of the intermediary adapted to attach to a flexible connector and the other end of the intermediary adapted to attach to the radial lead, wherein the intermediary is attached to the radial lead by passing a tapered threaded end of the radial lead into the tapered threaded hole of the intermediary, and the strap is attached to the radial lead by passing a threaded end of the radial lead through an eyelet of the strap and securing the threaded end of the radial lead to the eyelet with at least one threaded washer.

13. An apparatus adapted to form a conductive path for carrying an electric current in a generator, the apparatus comprising:
- an electrically conductive axial lead having a first end and a second end, and forming a portion of the conductive path;
- an electrically conductive strap having a first end and a second end, and forming a portion of the conductive path;
- an electrically conductive radial lead having a first end and a second end, the radial lead forming a portion of the conductive path and coupled to the axial lead and to the strap, the radial lead not being supported by a blower hub wedge portion of the generator, and
- an electrically conductive intermediary having a generally semicircular configuration and a first end and a second end with a tapered threaded hole positioned therebetween, one end of the intermediary adapted to attach to a flexible connector and the other end of the intermediary adapted to attach to the radial lead,
- wherein an exciter is directly attached to the axial lead, the axial lead is directly attached to the flexible connector, the flexible connector is directly attached to the intermediary, the intermediary is directly attached to the radial lead, and the radial lead is directly attached to the strap.

14. The apparatus of claim 13, wherein the generator has a rotor that extends along the axial length of the generator.

15. The apparatus of claim 14, wherein the current travels in a closed loop from an exciter through the rotor and then back to the exciter.

16. The apparatus of claim 13, wherein the axial lead has a generally semicircular configuration with first and second ends that collectively comprise an inboard end and an outboard end, the axial lead adapted to attach to an exciter.

17. The apparatus of claim 13, wherein the strap is generally J-shaped with first and second ends, the first end having an eyelet and the second end adapted to attach to a coil winding portion of the generator.

18. The apparatus of claim 17, wherein the eyelet is sized and configured to attach to a threaded end of the radial lead.

19. The apparatus of claim 13, wherein the radial lead has a generally cylindrical configuration with first and second ends that collectively comprise an upper end and a lower end, the lower end having a tapered threading and the upper end having a threading, one end of the radial lead adapted to attach to the strap.

20. The apparatus of claim 13, further comprising an electrically conductive flexible connector having a plurality of conductive sheets, at least a portion of at least one sheet being attached to at least a portion of another sheet, the flexible connector forming a portion of the conductive path and adapted to bend in response to normal stress and load forces produced by the generator.

* * * * *